May 17, 1932.  R. J. HARRY  1,858,929
TRACK WHEEL
Filed June 12, 1930  2 Sheets-Sheet 1
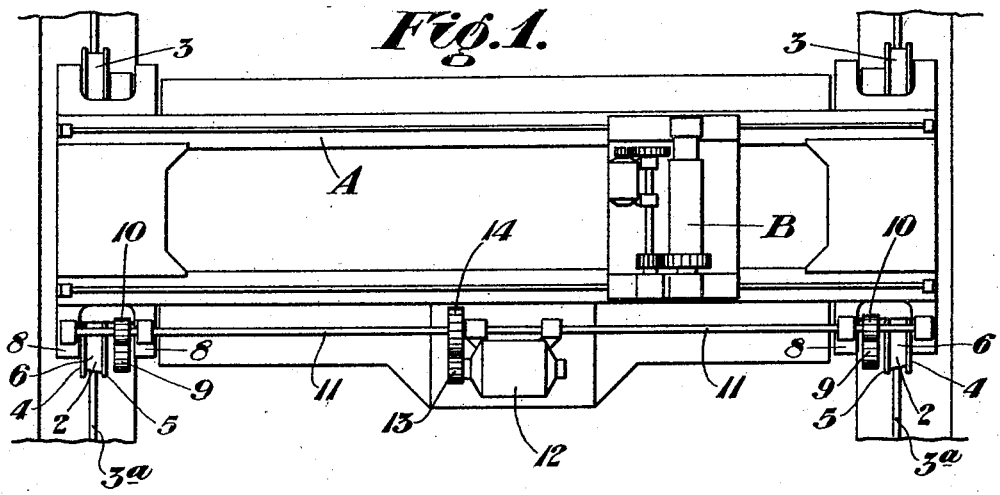
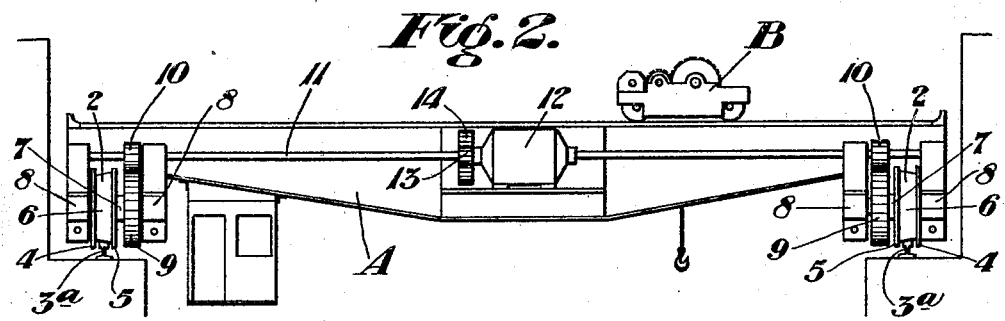
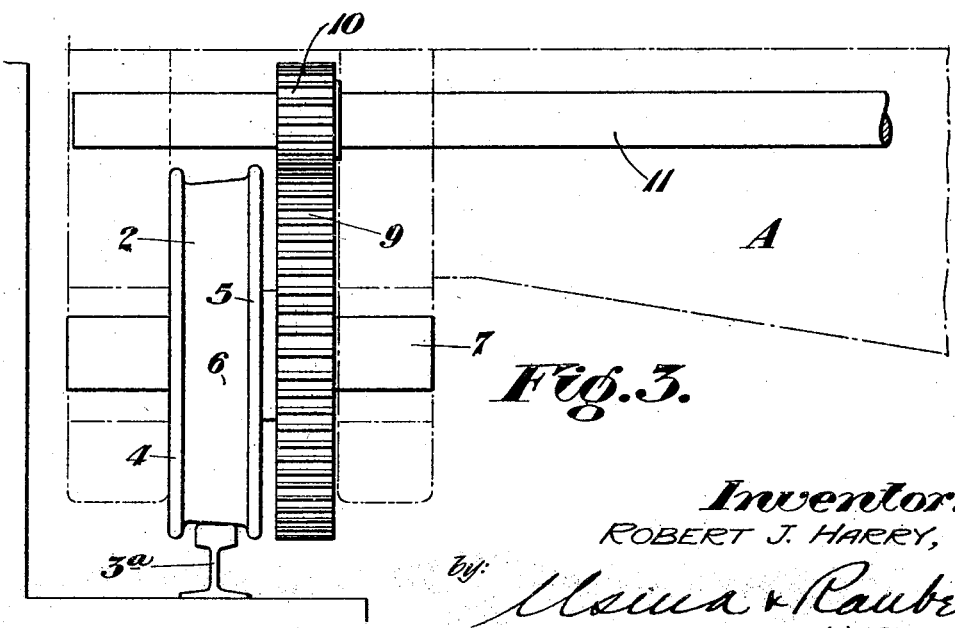
Inventor:
ROBERT J. HARRY,
by Usina & Rauber
his Attorneys.

May 17, 1932. R. J. HARRY 1,858,929
TRACK WHEEL
Filed June 12, 1930 2 Sheets-Sheet 2
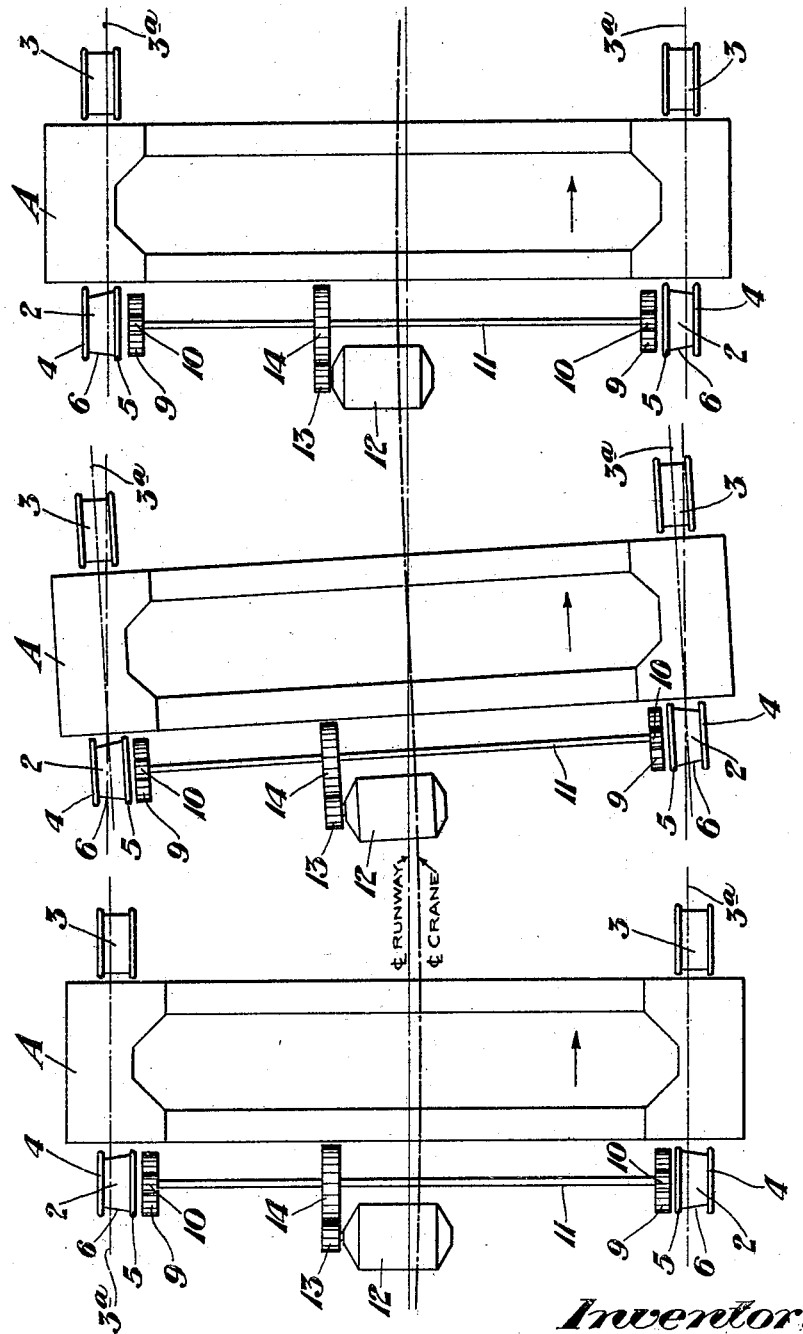
Inventor:
ROBERT J. HARRY,
by:
his Attorneys.

Patented May 17, 1932

1,858,929

UNITED STATES PATENT OFFICE

ROBERT J. HARRY, OF HOMESTEAD, PENNSYLVANIA

TRACK WHEEL

Application filed June 12, 1930. Serial No. 460,721.

This invention relates to track wheels and more particularly to double flanged track wheels for use on overhead cranes, charging machines, ore bridges, lorry cars and the like, where it is desired to prevent undue friction between the flanges of the wheels and the sides of the rail heads.

Heretofore, double flanged track wheels have been used having a cylindrical tread. With this prior art type of wheel many cases of unsatisfactory service were obtained. In crane applications unsatisfactory operation has resulted from such causes as crooked runway track, track out of level, slippery rails on one side of the track or runway, and lack of uniformity of the crane span. All of the above defects cause the crane to twist and result in excessive friction between the flanges of the wheels and the sides of the rail heads. Since all the driven wheels are made of exactly the same diameter and the treads are cylindrical, there is no tendency to remove the twist from the crane or other carriage. From the above it will readily be understood that unsatisfactory service and short life of wheels and rails are obtained with double flanged track wheels having a cylindrical tread.

The present invention has for its object the provision of a novel form of double flanged track wheel which will be self-alining and will overcome all of the above objections resulting from double flanged wheels having a cylindrical tread.

Figure 1 is a plan of a crane having track wheels constructed in accordance with this invention.

Figure 2 is a side elevation thereof.

Figure 3 is an enlarged detail showing one of the driving wheels.

Figures 4, 5 and 6 are diagrammatic plan views showing the various positions assumed by a crane, having driving wheels constructed in accordance with this invention after it has become twisted or out of square.

Referring more particularly to the drawings, the letter A designates an overhead crane having track wheels 2 and 3. The crane A is of usual construction and is provided with a traveling hoist B. The crane A is adapted to travel on track rails 3a.

The wheels 2 are provided with flanges 4 and 5 on the opposite sides of the tread 6, and the tread 6 is tapered from the inside to the outside toward the axis of the wheel.

In the crane shown and in most of the apparatus on which double flanged wheels are used, two of the wheels 2, one on each side, are connected together for drive wheels so as to rotate together at the same speed. The track wheels 2 and 3 of the crane A are secured on axles 7 journaled in bearings 8. The axles of the wheels 2 on the rear side of the crane are each provided with gears 9 which are meshed with pinions 10 on a drive-shaft 11, which shaft is driven by a motor 12 through a pinion 13 and gear 14.

When a crane or other structure equipped with tapered tread track wheels becomes twisted or out of square with the runway or track, the driving track wheel on one end of the crane rolls on a smaller diameter portion of the tread than that of the driving track wheel on the other end of the crane, as shown in Figure 4. Consequently since both wheels are rotating at the same R. P. M. the wheel traveling on the larger diameter portion of the tread will move along the track faster than the wheel traveling on the smaller diameter portion of the tread. As the crane moves along the track it gets into the position shown in Figure 5, that is, the end propelled by the wheel traveling on the larger diameter tread is advanced until the wheels are all traveling on portions of the tread of equal diameter. As the crane progresses in its travel along the track, the condition illustrated in Figure 4 is reversed. This causes the center of the crane to describe a reversing curved path as it moves along its runway or track and results in the crane assuming the position shown in Figure 6 and in intermittent contact between the flanges of the wheels and the sides of the rail heads.

The use of wheels in accordance with this invention reduces the power required to propel the crane or other device, since only intermittent contact is established between the wheel flanges and rail heads and less friction results.

The use of the wheels of this invention on a crane also produces a safer operating crane, since cranes having the usual cylindrical tread will jump the track when out of square, while the wheels of this invention will cause the crane to square itself before it jumps the track.

Many other advantages will be apparent to those skilled in the art such as longer life of the wheels due to reduced wear of the flanges, and generally improved operation of the crane.

While I have shown one specific embodiment of my invention, it will be understood that I do not wish to be limited thereto since various modifications of the invention may be made without departing from the scope thereof, as defined in the appended claims.

I claim:

1. The combination with a traveling crane adapted to travel on a track composed of spaced substantially parallel rails, of track wheels arranged in pairs on said crane, at least one pair of said wheels being arranged to be positively driven at the same number of revolutions in a given time, said wheels each comprising a body portion having a flange on each side of the tread and having its tread in the form of the frustrum of a cone.

2. The combination with a wheeled carriage adapted to travel on a track composed of spaced substantially parallel rails, of track wheels arranged in pairs on said carriage, at least one pair of said wheels being arranged to be driven at the same number of revolutions in a given time, said wheels each comprising a body portion having a flange on each side of the tread and having its tread of materially greater width than the rail head and tapered materially toward the wheel axis from the inside flange toward the outside flange.

In testimony whereof, I have hereunto set my hand.

ROBERT J. HARRY.